US007153459B2

(12) United States Patent
Kitahara

(10) Patent No.: US 7,153,459 B2
(45) Date of Patent: Dec. 26, 2006

(54) METHOD OF MANUFACTURING AN INK JET TYPE RECORDING HEAD

(75) Inventor: Tsuyoshi Kitahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 10/364,336

(22) Filed: Feb. 12, 2003

(65) Prior Publication Data

US 2003/0117463 A1 Jun. 26, 2003

Related U.S. Application Data

(62) Division of application No. 09/878,324, filed on Jun. 12, 2001, now Pat. No. 6,547,373.

(30) Foreign Application Priority Data

Jun. 12, 2000 (JP) .......................... P.2000-175120
Jun. 8, 2001 (JP) .......................... P.2001-173432
Jun. 11, 2001 (JP) .......................... P.2001-175656

(51) Int. Cl.
*B29C 45/14* (2006.01)

(52) U.S. Cl. .................... 264/238; 264/275; 264/279.1

(58) Field of Classification Search ..................... None
See application file for complete search history.

(56) References Cited

U.S. PATENT DOCUMENTS 5,297,336 A * 3/1994 Burolla ...................... 29/890.1
5,482,660 A * 1/1996 Yamamoto et al. ......... 264/474
5,774,151 A 6/1998 Sugitani et al.
5,933,163 A 8/1999 Koizumi et al.
5,983,471 A * 11/1999 Osawa ...................... 29/25.35
6,036,303 A * 3/2000 Yamamoto et al. ........... 347/70
6,250,753 B1 6/2001 Nishiwaki et al.
6,325,493 B1 * 12/2001 Yamaguchi .................. 347/65
6,383,436 B1 * 5/2002 Nishimuro et al. ......... 264/245
6,440,352 B1 * 8/2002 Sasaki et al. ............... 264/512
6,471,901 B1 * 10/2002 Kawamura et al. ......... 264/267
6,668,453 B1 * 12/2003 Shibata ...................... 29/890.1

FOREIGN PATENT DOCUMENTS

EP 0 336 043 A2 10/1989
EP 0 732 208 A1 9/1996
EP 0 985 535 A2 3/2000
JP 60-34871 A 2/1985
JP 60064871 A 4/1985
JP 5-77416 A 3/1993
JP 5077416 A 3/1993
JP 6-143561 A 5/1994

(Continued)

OTHER PUBLICATIONS

Patent Abstracts of Japan, vol. 017, No. 397 (M-1452), Jul. 26, 1993 & JP 05 077416 A (Seikosha Co Ltd), Mar. 30, 1993.

(Continued)

*Primary Examiner*—Edmund H. Lee
(74) *Attorney, Agent, or Firm*—Sughrue Mion, PLLC

(57) ABSTRACT

A nozzle plate (8) having a nozzle opening (10) formed thereon, a passage forming substrate (70) having a pressure chamber (12), an ink supply port (13) and a common ink chamber (11) formed sequentially to communicate with the nozzle opening (10), and a vibrating plate (9) for being deformed to pressurize the pressure chamber (12) are provided and laminated to constitute a passage unit (30). The passage forming substrate (70) is fabricated by an insert molding using a reinforcing plate (72) as a core and a portion to be an ink passage is partitioned and formed by a resin (71).

14 Claims, 7 Drawing Sheets

FOREIGN PATENT DOCUMENTS

| | | | |
|---|---|---|---|
| JP | 6-246920 | A | 9/1994 |
| JP | 6246920 | A | 9/1994 |
| JP | 07-266566 | * | 10/1995 |
| JP | 7-266566 | A | 10/1995 |
| JP | 7266566 | A | 10/1995 |
| JP | 9314863 | A | 12/1997 |
| JP | 2001-096746 | A | 10/2001 |

OTHER PUBLICATIONS

Patent Abstracts of Japan, vol. 1999, No. 8, Jun. 30, 1999 & JP 11 058751 A (Hitachi Koki Co Ltd), Mar. 2, 1999.

Patent Abstracts of Japan, vol. 008, No. 012 (M-269), Jan. 19, 1984 & JP 58 175667 A (Epuson KK; others: 01) Oct. 14, 1983.

* cited by examiner

METHOD OF MANUFACTURING AN INK JET TYPE RECORDING HEAD

This is a divisional of application Ser. No. 09/878,324 filed Jun. 12, 2001 now U.S. Pat. No. 6,547,373; the disclosure of which is incorporated herein by reference.

BACKGROUND OF THE INVENTION

1. Technical Field of the Invention

The present invention relates to an ink jet type recording head to be suitably used for a printer or a plotter.

2. Related Art

A related ink jet type recording head, for example, an ink jet type recording head using a piezoelectric vibrator as a pressure generating element, comprises a nozzle plate having a plurality of nozzle openings provided in a line, a passage forming substrate in which an ink passage for communicating with the nozzle openings from a common ink chamber to a pressure chamber is formed, and a vibrating plate to be apart of a diaphragm of the pressure chamber, and each member is bonded in a lamination state to constitute a passage unit and the passage unit is bonded to a case. The passage forming substrate is fabricated by etching a silicon wafer, for example, and a nozzle plate formed of stainless is bonded to one of surfaces of the passage forming substrate and the vibrating plate is bonded to the other surface. The vibrating plate is constituted by a composite plate member having a resin film laminated on a support plate formed of stainless.

In the passage unit having such a structure, the passage forming substrate formed of silicon sets limitations to the directivity of the etching and the etching should be carried out to leave a silicon crystal (111) surface. For this reason, the pressure chamber and the common ink chamber which are formed on the passage forming substrate put restrictions on shapes. Consequently, there is a problem in that a desirable shape is obtained with difficulty.

Moreover, there is also a problem in that the passage forming substrate is cut out of the silicon wafer so that it has a size restriction and is not suitable for an increase in the size.

Furthermore, there is a difference between a coefficient of linear expansion of silicon to be used for the passage forming substrate and a coefficient of linear expansion of a stainless plate to be used for the support plate of the vibrating plate and the nozzle plate. Therefore, there is also a problem in that the passage unit is flexed with a change in a temperature.

SUMMARY OF THE INVENTION

It is an object of the invention to solve the problems and to provide an ink jet type recording head capable of fabricating a pressure chamber and a common ink chamber to have desirable shapes and maintaining a rigidity required for a passage forming substrate.

In order to achieve the object, the invention has been proposed. A first aspect of the invention is directed to an ink jet type recording head comprising:

a passage unit including a passage forming substrate provided with a serial ink passage communicating with a nozzle opening from a common ink chamber through a pressure chamber; and a pressure generating element for varying pressure within the pressure chamber, wherein the passage forming substrate is formed by an integral molding using a resin for partitioning the ink passage and a reinforcement as a core of the passage forming substrate.

Regarding the reinforcement of the present invention, the whole of the reinforcement may be buried in the passage forming substrate, and the part of the reinforcement may be exposed to the surface of the passage forming substrate.

A second aspect of the invention is directed to the ink jet type recording head according to the first aspect, wherein a contact portion with ink in the ink passage is formed of the resin.

A third aspect of the invention is directed to the ink jet type recording head according to the first or second aspect, wherein the ink passage is constituted by the common ink chamber, an ink supply port, the pressure chamber and a nozzle communicating port.

A fourth aspect of the invention is directed to the ink jet type recording head according to any of the first to third aspects, wherein the reinforcement is formed of a material having a greater Young's modulus than that of the resin.

A fifth aspect of the invention is directed to the ink jet type recording head according to any of the first to fourth aspects, wherein the reinforcement is formed of a material having a higher density than that of the resin.

A sixth aspect of the invention is directed to the ink jet type recording head according to any of the first to fifth aspects, the reinforcement is formed of a material having a coefficient of linear expansion which is equal to or smaller than that of the resin.

A seventh aspect of the invention is directed to the ink jet type recording head according to any of the first to sixth aspects, wherein the reinforcement has a thickness set to be equal to or greater than a half of a thickness of the passage forming substrate.

An eighth aspect of the invention is directed to the ink jet type recording head according to any of the third to seventh aspects, wherein the reinforcement is a plate-shaped member having a rectangular opening for surrounding a line of the nozzle communicating ports.

A ninth aspect of the invention is directed to the ink jet type recording head according to the seventh aspect, wherein the thickness of the reinforcement is set to be equal to that of the passage forming substrate, an internal wall portion of the reinforcement is covered with the resin, thereby divining the ink passage.

A tenth aspect of the invention is directed to the ink jet type recording head according to any of the first to eighth aspects, wherein the passage forming substrate is formed by outsert molding to expose one surface of the reinforcement to one surface of the passage forming substrate.

The "outsert mold" implies that integral molding is carried out with a part of a core material exposed to the surface of a molded product.

An eleventh aspect of the invention is directed to the ink jet type recording head according to any of the first to ninth aspects, wherein a neutral line of the single reinforcement for bending in a direction of a thickness is made equal to that of the passage forming substrate.

A twelfth aspect of the invention is directed to the ink jet type recording head according to any of the first to eleventh aspects, wherein the passage unit includes a nozzle plate having the nozzle opening formed thereon, and a coefficient of linear expansion of the passage forming substrate is set to be equal to that of the nozzle plate.

A thirteenth aspect of the invention is directed to the ink jet type recording head according to any of the first to eleventh aspects, wherein the passage unit includes a nozzle plate having the nozzle opening formed thereon, and a side wall of the ink passage is provided with a draft taper to be enlarged and opened from a junction surface with the nozzle plate in the passage forming substrate toward an opposite surface of the junction surface.

A fourteenth aspect of the invention is directed to the ink jet type recording head according to the twelfth or thirteenth aspect, wherein the reinforcing plate and the nozzle plate are formed of the same metal material.

A fifteenth aspect of the invention is directed to the ink jet type recording head according to any of the first to eleventh aspects, wherein the nozzle opening is formed integrally with the passage forming substrate by the molding using the resin.

A sixteenth aspect of the invention is directed to the ink jet type recording head according to the fifteenth aspect, wherein a bottom portion of the common ink chamber at the nozzle opening side is formed integrally with the passage forming substrate by the molding and the resin in the bottom portion is formed thinly to be a compliance portion.

A seventeenth aspect of the invention is directed to the ink jet type recording head according to any of the first to fourteenth aspects, wherein the passage unit includes a vibrating plate for sealing a part of the pressure chamber and changing the volume of the pressure chamber by deformation, and the coefficient of linear expansion of the passage forming substrate is set to be equal to that of the vibrating plate.

An eighteenth aspect of the invention is directed to the ink jet type recording head according to the seventeenth aspect, wherein the vibrating plate is constituted by a composite plate member having an elastic film laminated on a support plate, and the reinforcing plate and the support plate are formed on the same metal material.

A nineteenth aspect of the invention is directed to the ink jet type recording head according to any of the first to eleventh aspects, wherein the reinforcing plate is constituted by a heat generating member for generating heat by supply of a voltage.

A twentieth aspect of the invention is directed to the ink jet type recording head according to the nineteenth aspect, wherein the heat generating member is a ceramics heater.

A twenty-first aspect of the invention is directed to the ink jet type recording head according to any of the first to twentieth aspects, wherein the pressure generating element is constituted by a piezoelectric vibrator.

Further in order to achieve the object, the invention has been proposed. A twenty second aspect of the invention is directed to a method of manufacturing an ink jet type recording head which includes a passage unit having a passage forming substrate provided with a ink passage, the method comprises the step of:

molding the passage forming substrate in a resin for partitioning the ink passage and a reinforcement as a core of the passage forming substrate with using a mold.

A twenty third aspect of the invention is directed to the method of manufacturing the ink jet type recording head according to the twenty second aspect, the molding step includes the steps of:

applying the resin and the reinforcement to a first mold of the mold having a cavity formed in conformity with an external shape of the passage forming substrate;

setting a plate-shaped second mold of the mold on the first mold.

A twenty fourth aspect of the invention is directed to the method of manufacturing the ink jet type recording head according to the twenty third aspect, an abutment surface of the first mold and the second mold is aligned with a junction surface with a nozzle plate in the passage forming substrate.

A twenty fifth aspect of the invention is directed to the method of manufacturing the ink jet type recording head according to the twenty fourth aspect, the reinforcement is buried in the resin.

A twenty third sixth of the invention is directed to the method of manufacturing the ink jet type recording head according to the twenty fourth aspect, a part of the reinforcement is exposed to the junction surface.

A twenty seventh aspect of the invention is directed to the method of manufacturing the ink jet type recording head according to the twenty third aspect, the cavity is inclined to be expanded and opened toward the second mold.

A twenty eighth aspect of the invention is directed to the method of manufacturing the ink jet type recording head according to the twenty third aspect, the cavity has a portion formed in conformity with an external shape of a nozzle opening to integrally forming the nozzle opening with the passage form substrate.

A twenty ninth aspect of the invention is directed to the method of manufacturing the ink jet type recording head according to the twenty eighth aspect, in the setting step, a clearance is provided between the first mold and the second mold to cover a portion to be the nozzle opening with a resin layer, the molding step further includes the step of wrapping the resin layer to expose the nozzle opening.

The present disclosure relates to the subject matter contained in Japanese patent application Nos. 2000-175120 (filed on Jun. 12, 2001), 2001-173432 (filed on Jun. 6, 2001) and 2000-175656 (filed on Jun. 11, 2001), which are expressly incorporated herein by reference in their entireties.

DETAILED DESCRIPTION OF PREFERRED EMBODIMENT

Figure 1:
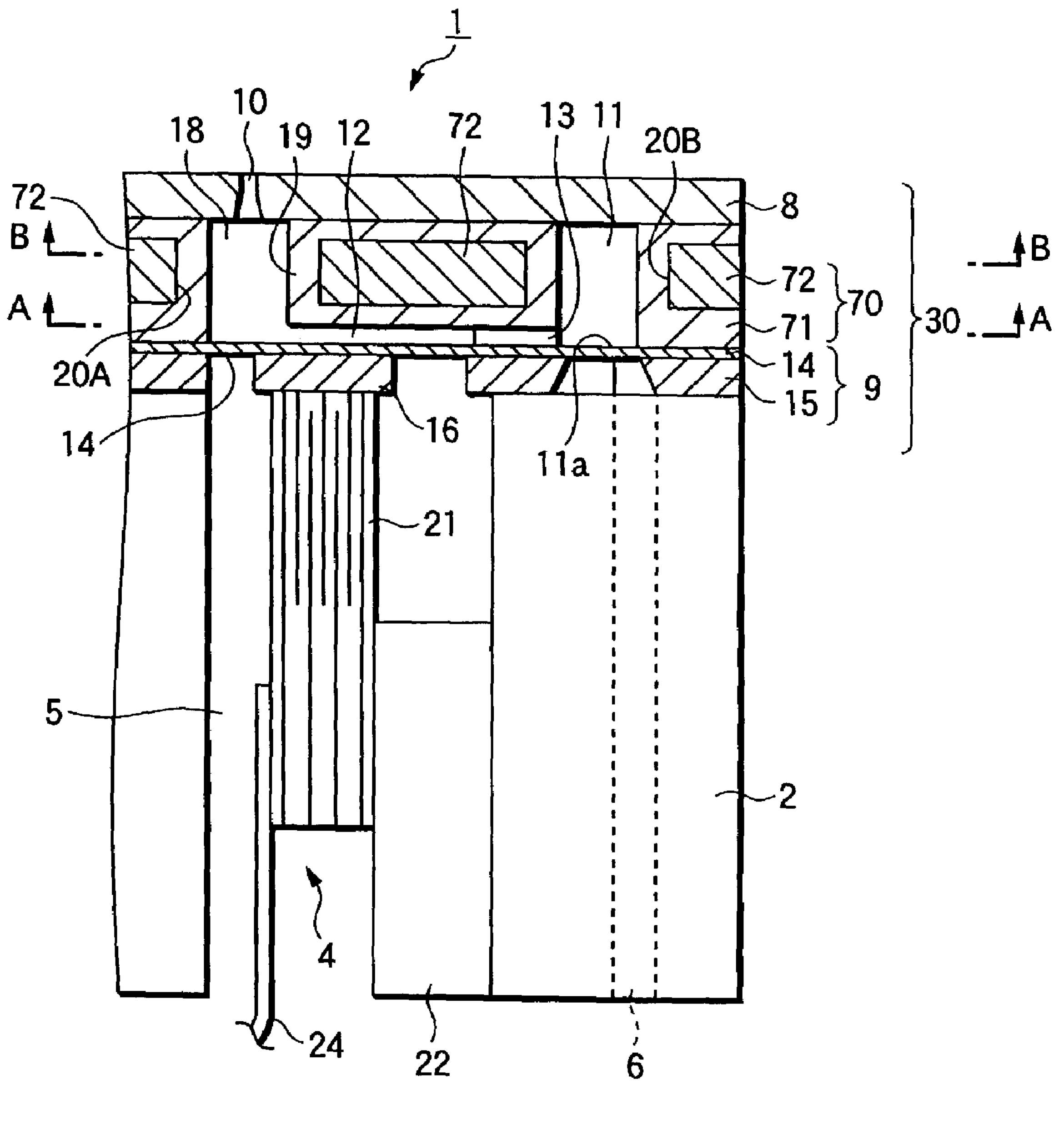
FIG. 1 is a sectional view showing an ink jet type recording head according to a first embodiment.
Figure 2:
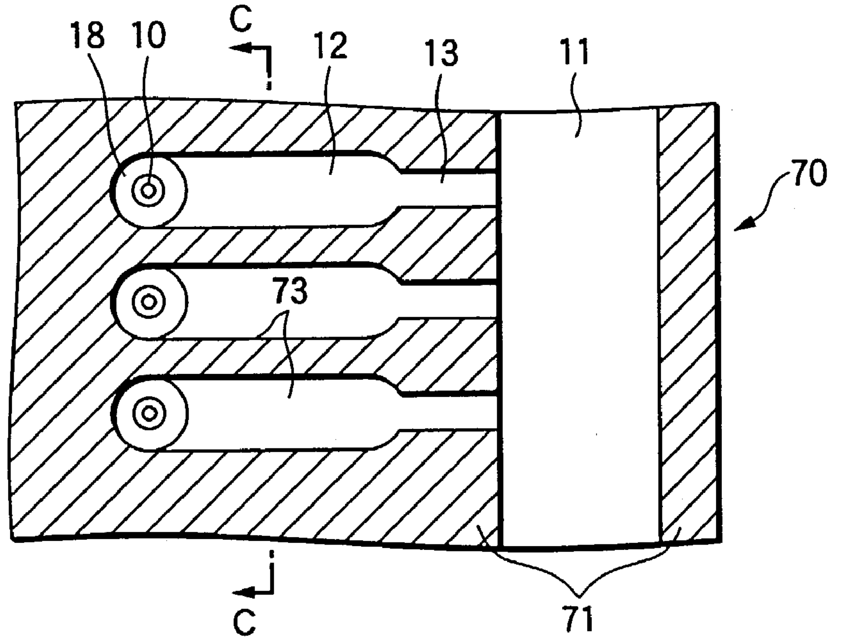
FIG. 2 is a sectional view showing the recording head illustrated in FIG. 1 which is taken along the line A—A.
Figure 3:
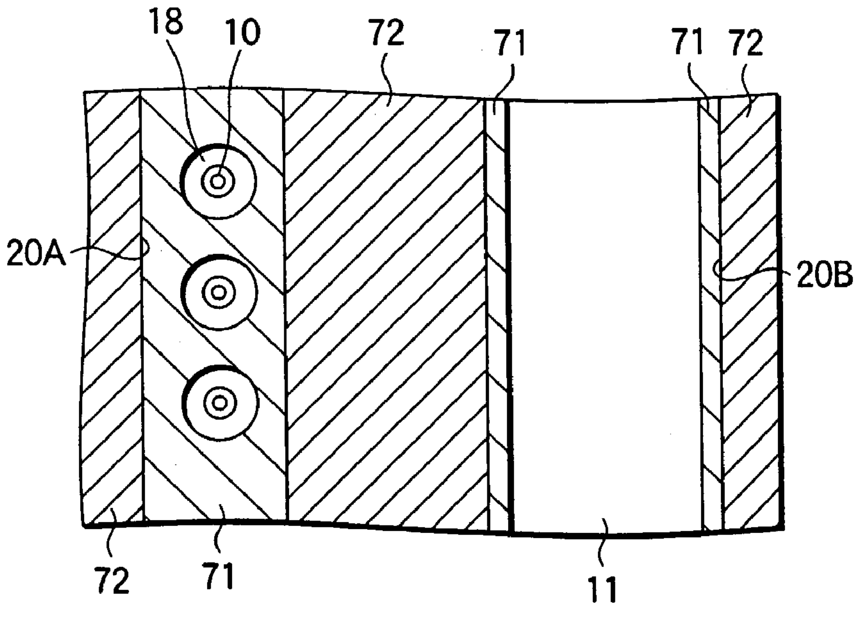
FIG. 3 is a sectional view showing the recording head illustrated in FIG. 1 which is taken along the line B—B.
Figure 4:
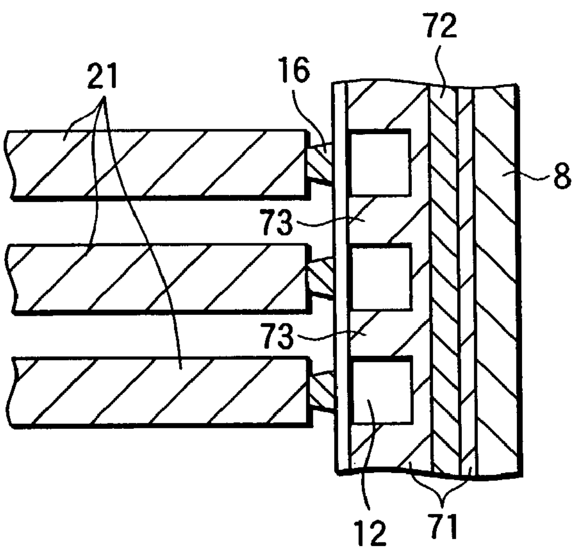
FIG. 4 is a sectional view taken along the line C—C in FIG. 2.

An embodiment of the invention will be described below with reference to the drawings. FIG. 1 is a sectional view showing an ink jet type recording head 1 according to the embodiment, FIG. 2 is a sectional view showing the recording head 1 illustrated in FIG. 1 which is taken along the line A—A, FIG. 3 is a sectional view taken along the line B—B, and FIG. 4 is a sectional view taken along the line C—C in FIG. 2.

The illustrated recording head 1 comprises; a piezoelectric vibrator unit 4 having a plurality of piezoelectric vibrators 21 . . . , a fixed plate 22 and a flexible cable 24 which are unitized; a case 2 capable of accommodating the piezoelectric vibrator unit 4; and a passage unit 30 to be bonded to the tip face of the case 2. The case 2 is a block-shaped member formed of a synthetic resin which forms a housing space portion 5 having both a tip and a rear end opened, and the piezoelectric vibrator unit 4 is accommodated and fixed into the housing space portion 5. The piezoelectric vibrator unit 4 is maintained in a state in which a comb-shaped tip of the piezoelectric vibrator 21 faces an opening on the tip side of the housing space portion 5, and the fixed plate 22 is bonded to the wall surface of the housing space portion 5.

The piezoelectric vibrator 21 is a kind of pressure generating element and is formed to have the shape of a longitudinal elongated comb. For example, the piezoelectric vibrator 21 is cut out like a very thin needle having a width of approximately 50 μm to 100 μm. The piezoelectric vibrator 21 is a lamination type piezoelectric vibrator which is constituted by alternately laminating a piezoelectric body and an internal electrode, and is a longitudinal vibration type (d31 effect) type piezoelectric vibrator capable of being extended in a longitudinal direction which is orthogonal to the direction of the lamination. Each of the piezoelectric vibrators 21 . . . has a base end side portion bonded onto the fixed plate 22 and has a free end attached in a state of a cantilever to be protruded outward from the edge of the fixed plate 22. Moreover, the comb-shaped tip of each of the piezoelectric vibrators 21 . . . is caused to abut on and is fixed to an island portion 16 to be a predetermined portion of the passage unit 30 as shown in FIG. 4. The flexible cable 24 is electrically connected to the piezoelectric vibrator 21 on the side surface of the base end of the vibrator which is opposite to the fixed plate 22.

The passage unit 30 has such a structure that the nozzle plate 8 is provided on one of surface sides of the passage forming substrate 70 and the vibrating plate 9 provided on the other surface side of the passage forming substrate to be the opposite side of the nozzle plate 8, thereby the passage forming substrate 70 being interposed therebetween.

The nozzle plate 8 is a thin plate formed of stainless which has a plurality of nozzle openings 10 . . . provided in a line with a pitch corresponding to a dot formation density. In the embodiment, 96 nozzle openings 10 . . . are provided with a pitch of 180 dpi and a nozzle line is constituted by the nozzle openings 10 . . . . A number of nozzle lines which are formed correspond to a number of a color of an ink which can be discharged.

The passage forming substrate 70 is a plate-shaped member provided with an ink passage including a common ink chamber 11, an ink supply port 13, a pressure chamber 12 and a nozzle communicating port 18. In the embodiment, the passage forming substrate 70 is fabricated through integral molding by using a reinforcement 72 as a core, and the ink passage is partitioned by a resin. The passage forming substrate 70 will be described below in detail.

The vibrating plate 9 is a composite plate member having a double structure in which a resin film 14 such as PPS (polyphenylene sulfide) is laminated on the support plate 15 formed of stainless, and functions as a sealing portion for sealing one of opening surfaces of the pressure chamber 12 and also functions as a compliance portion for sealing one of opening surfaces of the common ink chamber 11. Etching is carried out over a part for functioning as the sealing portion, that is, a part corresponds to the pressure chamber 12, and the same part is removed annularly to form an island portion 16 for causing the tip portion of the piezoelectric vibrator 21 to abut thereon and to be fixed thereto. The island portion 16 is formed in an elongated block-like shape elongated in a direction perpendicular to the direction in which the line of the nozzle openings 10 is extended in the same manner as the planar shape of the pressure chamber 12, and the resin film 14 provided around the island portion 16 functions as an elastic film. Moreover, a part of the stainless plate for functioning as the compliance portion, that is, a part corresponding to the common ink chamber 11 is removed by etching to leave only the resin film 14.

In the recording head 1 having the structure described above, the piezoelectric vibrator 21 is extended in the longitudinal direction of the vibrator so that the island portion 16 is pressed toward the nozzle plate 8 and the resin film 14 is deformed around the island portion and the pressure chamber 12 is compressed. Moreover, when the piezoelectric vibrator 21 is compressed in the longitudinal direction of the vibrator, the pressure chamber 12 is expanded by the elasticity of the resin film 14. By controlling the expansion and compression of the pressure chamber 12, an ink pressure in the pressure chamber 12 fluctuates so that an ink drop is discharged from the nozzle opening 10.

Next, the passage forming substrate 70 will be described in detail. As shown in FIG. 2, the passage forming substrate 70 is a plate-shaped member in which a plurality of space portions to be the pressure chambers 12 are formed corresponding to the nozzle openings 10 . . . and are partitioned by a diaphragm 73, and space portions to be the ink supply port 13 and the common ink chamber 11 are formed. The pressure chamber 12 is an elongated chamber elongated in a direction perpendicular to the direction in which the line of the nozzle openings 10 is extended (a direction of a nozzle line), and is constituted by a flat concave chamber partitioned by a weir portion 19. The weir portion 19 is formed from the outlet of the common ink chamber 11 to the inlet of the nozzle communicating port 18 and the ink supply port 13 is provided in the form of a bottleneck portion having a small passage width through the weir potion 19.

The nozzle communicating port 18 is a portion for communicating the pressure chamber 12 to the nozzle opening 10 and is formed on one of ends of the pressure chamber 12, that is, the nozzle communicating port 18 is formed at a position in the pressure chamber 12 which is the most distant from the common ink chamber 11. The common ink chamber 11 serves to supply an ink stored in an ink cartridge (not shown) into each of the pressure chambers 12 . . . and communicates with the other end of the corresponding pressure chamber 12 through the ink supply port 13. Moreover, an ink inlet 11*a* with which an ink supply pipe 6 communicates is opened on an almost central part in the longitudinal direction of the common ink chamber 11. The ink supplied from the ink cartridge is introduced from the ink inlet 11*a* into the common ink chamber 11 through the ink supply pipe 6.

Thus, the passage forming substrate 70 is provided with a serial ink passage sequentially passing through the common ink chamber 11, the ink supply port 13, the pressure chamber 12 and the nozzle communicating port 18. Therefore, the ink passage communicates the ink inlet 11*a* to the nozzle openings 10 . . . .

The passage forming substrate 70 according to the embodiment is fabricated by an insert molding using the reinforcement 72 as a core and the reinforcement 72 is buried in the resin 71. The reinforcement 72 is a plate-shaped member formed of stainless which forms a nozzle side opening portion 20A having a rectangular shape opening for surrounding the communicating port line in a position corresponding to the line of the nozzle communicating port 18, and an ink chamber side opening portion 20*b* having a opening whose size is larger than the common ink chamber 11 in a position corresponding to the common ink chamber 11. The reinforcement 72 has a thickness which is almost a half of the thickness of the passage forming substrate 70. The resin 71 is provided around the reinforcement 72 to partition and form an ink passage including the common ink chamber 11 and the pressure chamber 12.

Thus, the passage forming substrate 70 is fabricated by an insert molding in order to maintain the degree of freedom of the shape of the ink passage and a rigidity required for the passage forming substrate 70. In other words, since the ink passage portion is partitioned and formed by the resin 71, the ink passage can be fabricated to have a comparatively free shape with high dimensional precision. Moreover, since a contact portion with the ink is fabricated by the resin 71, a wettability of the ink becomes uniform so that the ink can be caused to flow stably.

Furthermore, the reinforcing plate 72 formed of stainless is used for the core. Therefore, a rigidity and a weight which might be obtained insufficiently by only the resin 71 can be supplemented by the reinforcing plate 72. Consequently, the necessary rigidity and weight can be obtained by the passage forming substrate 70 having a limited thickness. Therefore, it is possible to prevent the passage forming substrate 70 from being deformed by the operation of the piezoelectric vibrator 21 and the ink can be discharged stably. In other words, it is possible to prevent a drawback that the ink is discharged unstably due to the deformation of the passage forming substrate 70.

Moreover, since the reinforcing plate 72 can properly select a size and a thickness thereof, it can easily cope with an increase in the size of the recording head 1. Furthermore, since the reinforcing plate 72 can be fabricated by pressing, it can be fabricated in a large amount in a short time and the cost of the recording head can also be reduced.

While an epoxy resin can be suitably used for the molding resin 71, it is not restricted but various engineering plastics such as a polysulfone resin or a polyimide resin can be used. Referring to the reinforcing plate 72, moreover, it is preferable that a necessary rigid or weight should be obtained and a metal material other than stainless may be used or ceramics may be used. In the case in which the ceramics are used for the reinforcing plate 72, the reinforcing plate 72 is covered with the resin 71 and is therefore protected by the resin 71. Consequently, ceramics having a comparatively low toughness can be suitably used for the reinforcing plate 72.

As described above, the molding resin 71 constituting the passage forming substrate 70 mainly guarantees the shape or dimensional precision of the ink passage, and the reinforcement 72 mainly guarantees the rigidity of the whole passage forming substrate. Therefore, the reinforcement 72 is selected to satisfy the following conditions.

More specifically, referring to a Young's modulus, a material having a greater Young's modulus than the Young's modulus of the resin 71 is used for the reinforcement 72. Referring to a density, a material having a higher density than the density of the resin 71 is used for the reinforcing plate 72. The reason is that a necessary rigidity or weight should be maintained for the whole passage forming substrate. In this respect, it is desirable that the thickness of the reinforcement 72 should be set to be a half of the thickness of the passage forming substrate 70 or more.

Referring to a coefficient of linear expansion, a material having a coefficient of linear expansion which is equal to or smaller than the coefficient of linear expansion of the resin 71 is used for the reinforcing plate 72. In other words, the nozzle plate 8 is bonded to one of the side surfaces of the passage forming substrate 70 and the vibrating plate 9 is bonded to the other side surface. Therefore, the whole passage unit has a three-layered structure having the nozzle plate 8, the passage forming substrate 70 and the vibrating plate 9. If a difference in a coefficient of linear expansion is made between the nozzle plate 8 and the passage forming substrate 70 or between the passage forming substrate 70 and the vibrating plate 9, a distortion is generated so that they are warped in the direction of a thickness when a thermal stress is applied. Consequently, the passage unit 30 is flexed and deformed. In order to prevent the flexing deformation, accordingly, the coefficients of linear expansion of the nozzle plate 8, the passage forming substrate 70 and the vibrating plate 9 should be equal to each other.

In general, a synthetic resin material tends to have a greater coefficient of linear expansion than the coefficient of linear expansion of a metal material. For example, a synthetic resin has a coefficient of linear expansion of approximately $10\times10^{-5}$ to $40\times10^{-5}$, and stainless used for the nozzle plate 8 and the support plate 15 of the vibrating plate 9 has a coefficient of linear expansion of approximately $11\times10^{-5}$ to $17\times10^{-5}$. For this reason, if a material having a coefficient of linear expansion which is equal to or smaller than the coefficient of linear expansion of the resin 71 is used for the reinforcement 72, the coefficients of linear expansion of the plate members 8, 70 and 9 can be equal to each other.

The vibrating plate 9 is a composite plate member including the support plate 15 and the resin film 14, and the resin film 14 has a much smaller thickness than the thickness of the support plate 15. Therefore, the coefficient of linear expansion of the vibrating plate 9 is determined depending on that of the support plate 15. Similarly, the coefficient of linear expansion of the passage forming substrate 70 is determined depending on that of the reinforcing plate 72.

From this viewpoint, in the embodiment, the nozzle plate 8, the reinforcing plate 72 and the support plate 15 are formed of stainless steel to be the same metal material. The use of the same material is the most preferable in that the coefficients of linear expansion of the plate members 8, 70 and 9 should be equal to each other.

Referring to the structure of the passage forming substrate 70, in the embodiment, a neutral line of a single member of the reinforcement 72 for bending in the direction of the thickness is aligned with and is caused to almost correspond to a neutral line of the passage forming substrate 70. The reason is that the passage forming substrate 70 should be prevented from being flexed and deformed due to a thermal stress. In other words, if the neutral line of the reinforcement 72 is shifted from that of the passage forming substrate 70, there is a possibility that a distortion might be generated when a thermal stress is applied and the passage forming substrate 70 may be warped in the direction of the thickness due to a difference in a coefficient of linear expansion between the reinforcement 72 and the synthetic resin 71. By causing the neutral line of the reinforcement 72 to almost correspond to that of the passage forming substrate 70, the warpage in the direction of the thickness can be prevented from being caused by the thermal stress. More specifically, the thickness of the resin 71 to be provided on the surface and back sides of the reinforcement 72 is adjusted to obtain a balanced configuration.

Figure 5:
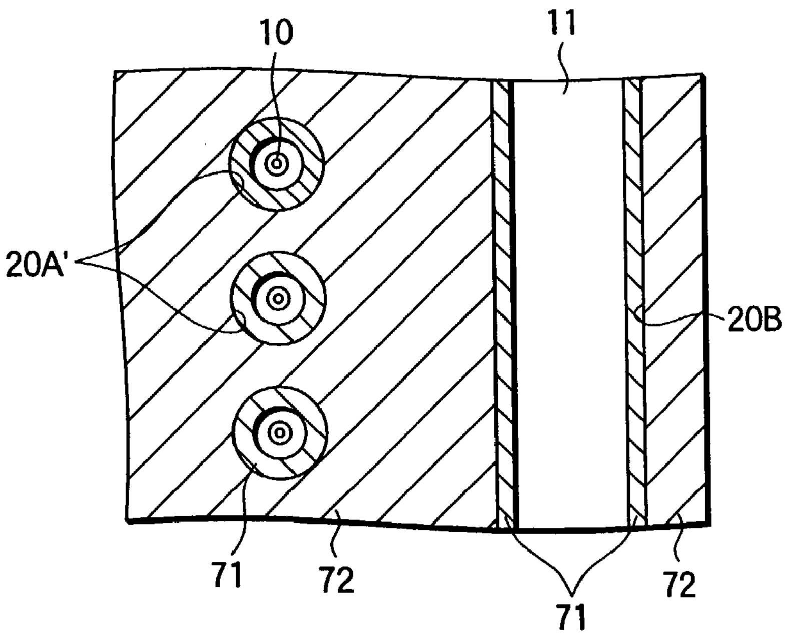
FIG. 5 is a sectional view showing a variant of a nozzle side opening which is taken along the line B—B in FIG. 1, FIGS. 6A to 6C are views illustrating a variant of the first embodiment, FIG. 6A being a view illustrating a mold and FIGS. 6B and 6C being sectional views showing a main part.

While the nozzle side opening 20A of the reinforcement 72 has such a rectangular shape as to surround the line of the nozzle communicating port 18 in the embodiment, this is not restricted. For example, as shown in FIG. 5, a plurality of nozzle side openings 20A' may be provided corresponding to the nozzle communicating ports 18.

Thus, there is an advantage that an adjacent crosstalk can be prevented if the nozzle side opening 20A' is provided for each nozzle communicating port 18. In other words, while a pressure fluctuation is generated on ink in the ink passage when the ink is discharged, the pressure fluctuation also acts on the nozzle communicating port 18. If the nozzle side opening 20A' is provided for each nozzle communicating port 18 as in the embodiment of FIG. 5, the rigidity of a part of the reinforcing plate 72 between the nozzle communicating ports 18 and 18 can be increased so that a pressure can be prevented from being propagated from the adjacent nozzle communicating port 18, resulting in a reduction in the interference of the nozzle communicating ports 18 and 18 with each other.

In the first embodiment, it is preferable that a draft inclination should be formed in a portion corresponding to the ink passage of the mold and the dividing line (parting line) of the mold should be aligned with a junction surface with the nozzle plate in the passage forming substrate.

Figure 6A:
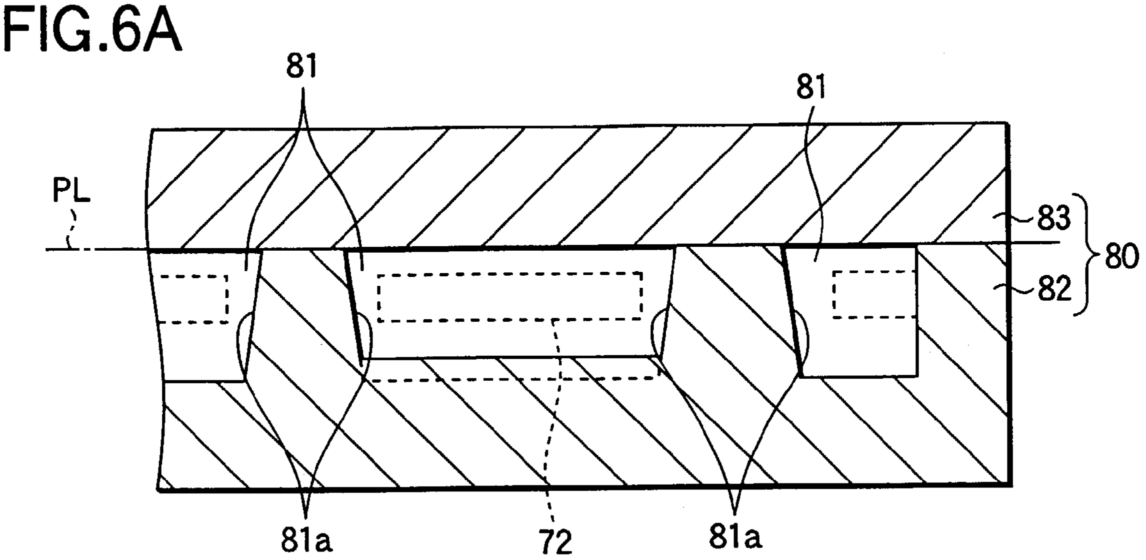

More specifically, as shown in FIG. 6A, the mold 80 for molding the passage forming substrate 70 is constituted by a first metal mold 82 having a cavity (concave portion) 81 fabricated in conformity with the external shape of the passage forming substrate 70 and a plate-shaped second metal mold 83 provided on the surface of the first metal mold 82.

Each side surface 81*a* partitioning the cavity 81 is inclined to be expanded and opened toward the opening, thereby forming a draft taper, and a parting line PL of the mold 80, that is, an abutment surface of the first metal mold 82 and the second metal mold 83 is aligned with the junction surface with the nozzle plate 8 in the passage forming substrate 70.

In the mold 80, the draft taper is formed on the side surface 81*a*. Therefore, the passage forming substrate 70 can be removed from the first metal mold 62 easily and reliably. Moreover, since the parting line PL is aligned with the junction surface with the nozzle plate 8, it is possible to easily remove a molding flash generated during molding. In other words, the mold flash can be removed through wrapping even if it is generated during the molding. Furthermore, since the wrapping can be carried out simultaneously with a processing of smoothing the junction surface with the nozzle plate, a working efficiency can also be enhanced.

Figure 6B:
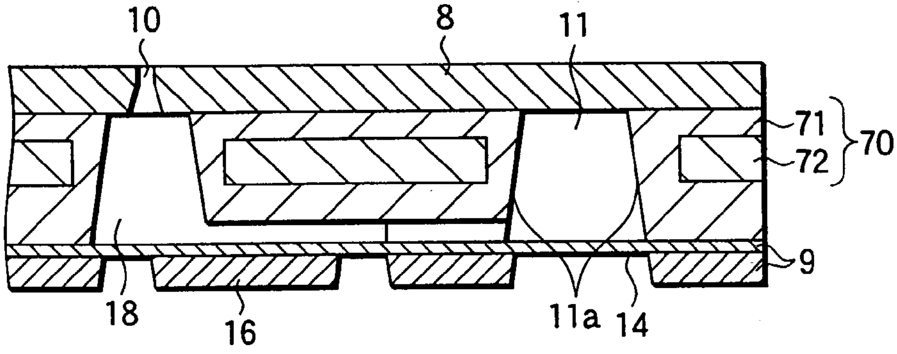
Figure 6C:
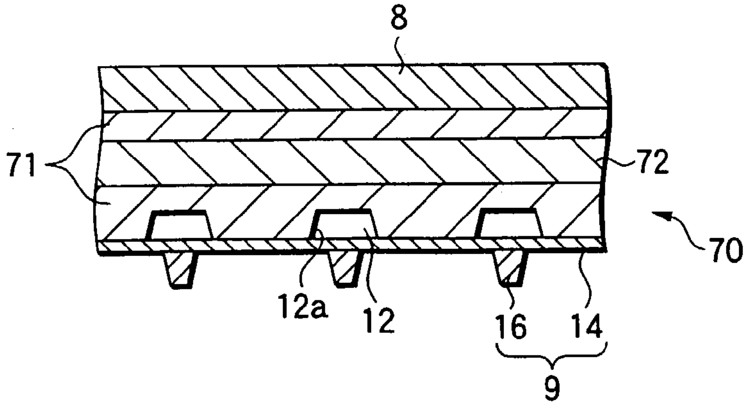

In the passage forming substrate 70 fabricated by the mold 80, as shown in FIGS. 6B and 6C, a draft taper to be expanded and opened from the junction surface with the nozzle plate 8 toward the opposite side junction surface with the vibrating plate 9 is formed on side walls of the ink passage, that is, side walls 11*a* and 12*a* of the common ink chamber 11 and the pressure chamber 12 and the nozzle communicating port 18.

Since the recording head 1 is used with the nozzle opening 10 turned downward, a bubble entering the common ink chamber 11 or the pressure chamber 12 easily floats toward the vibrating plate 9 side. Moreover, the inside diameter of the nozzle communicating port 18 is more reduced when the nozzle opening 10 is closer. For this reason, the ink in the nozzle communicating port 18 flows more quickly and the ink flows more smoothly if the nozzle opening 10 is closer.

In a bubble discharging operation for continuously discharging the ink from the nozzle opening 10 to forcibly discharge the bubble, consequently, the bubbles of the common ink chamber 1 and the pressure chamber 12 can be reliably delivered together with the ink flow and can be prevented from staying. In the nozzle communicating port 18, moreover, the bubbles can be reliably discharged from the nozzle opening 10.

While the passage unit 30 having the passage forming substrate 70 and the nozzle plate 8 constituted by separate members has been taken as an example in the first embodiment, the invention is not restricted to the structure. For example, the nozzle opening may be formed integrally with the passage forming substrate through a resin mold. A second embodiment of such a structure will be described below.

Figure 7:
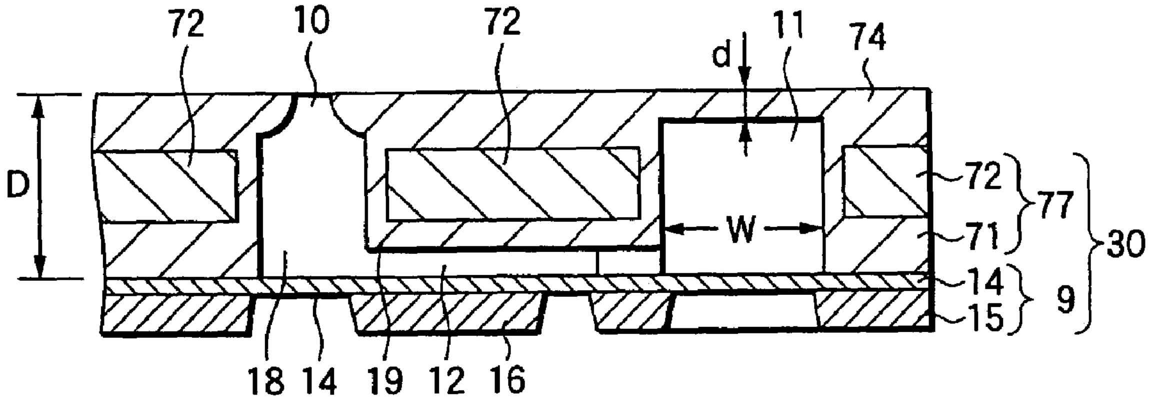
FIG. 7 is a sectional view showing a main part according to a second embodiment.

FIG. 7 is a view illustrating a passage unit 30 according to the second embodiment and the same members as those in the first embodiment have the same reference numerals. In the second embodiment, portions other than those shown in the drawing are the same as the portions in the first embodiment.

A passage unit 30 according to the second embodiment includes a passage forming substrate 77 having a nozzle in which a nozzle opening 10 is formed integrally and a vibrating plate 9. The nozzle opening 10 is an almost funnel-shaped portion formed by gradually reducing the diameter of a tip portion of a nozzle communicating port 18 toward the tip side (the upper side in FIG. 6). Thus, if the nozzle opening 10 is formed integrally, the nozzle communicating port 18 and the nozzle opening 10 can be formed seamlessly in series and an ink can be caused to flow smoothly. Consequently, the discharge stability of an ink drop can be enhanced still more. Moreover, since the nozzle opening 10 is also formed of a resin 71, the wettability of the ink in the same portion is also equal to that of the ink in the ink passage (a portion from a common ink chamber 11 to the nozzle communicating port 18). Also in this respect, the discharge stability of the ink drop can be enhanced.

Moreover, since the nozzle opening 10 is formed integrally with the passage forming substrate 77, a bottom portion on the nozzle opening 10 side of the common ink chamber 11, that is, a closed surface portion 74 is also formed integrally with the passage forming substrate 77. Accordingly, the common ink chamber 11 is molded to have a bottomed shape, that is, the shape of a groove. In the embodiment, a resin of the closed surface portion 74 is formed thinly to cause the closed surface portion 74 to function as a compliance portion of the common ink chamber 11.

A thickness d required for causing the closed surface portion 74 to function as the compliance portion is determined depending on a thickness D of the passage forming substrate 77 and a width W of the common ink chamber 11. For example, in the case in which the thickness D of the passage forming substrate 77 having a nozzle is approximately 500 μm and the width W of the common ink chamber 11 is approximately 1 to 2 mm, the closed surface portion 74 can be caused to function as the compliance portion by setting the thickness d of the closed surface portion 74 to approximately 100 μm.

By causing the closed surface portion 74 to function as the compliance portion, thus, the compliance of the common ink chamber 11 can be maintained easily and the degree of freedom of design can be increased. Moreover, the compliance can be adjusted by regulating the thickness of the closed surface portion 74. Therefore, it is possible to easily obtain a desirable compliance.

Figure 8A:
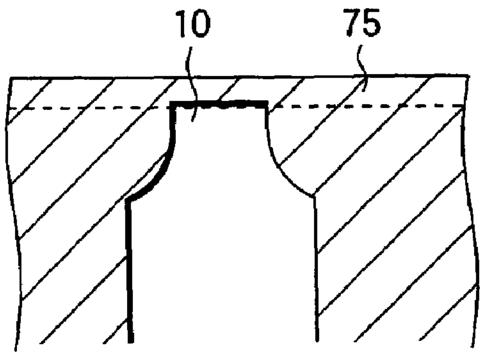
FIGS. 8A and 8B are typical views illustrating a manufacturing method according to the second embodiment.
Figure 8B:
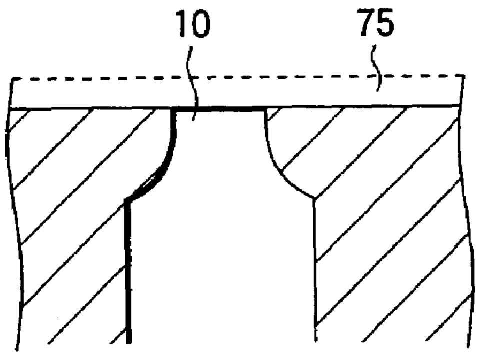

In order to mold the passage forming substrate 77 having a nozzle, it is preferable that a clearance should be provided between the molds in a portion corresponding to the nozzle opening 10 in the mold of the passage forming substrate 77. When the clearance is thus provided between the molds to carry out the molding, the tip end face of a portion to be the nozzle opening 10 is covered with a resin layer 75 as shown in FIG. 8A in the passage forming substrate 77 after mold releasing. As shown in FIG. 8B, then, the resin layer 75 is removed by wrapping (polishing) to expose the nozzle opening 10.

This processing is carried out to prevent the dimension of the nozzle opening 10 from being varied due to the wear of the mold. In other words, if the portion of the nozzle opening 10 is molded with the metal molds rubbed each other, there is a problem in that the shape of the nozzle opening 10 is gradually enlarged due to the wear of the rubbed portions. Since the shape of the nozzle opening 10 is the most important portion of an ink outlet, it is impossible to use a mold in which the nozzle opening 10 is excessively expanded. Moreover, since the nozzle opening 10 has a very small diameter, the wear is generated comparatively readily.

By carrying out the molding with a small gap opened between the metal molds as described above, a portion in the metal mold where the nozzle opening 10 is to be molded can be prevented from being worn and the metal mold can be used for a long period of time. Consequently, a manufacturing cost can be reduced and a recording head 1 can be provided inexpensively.

While the reinforcement 72 is buried in the resin 71 in each of the embodiments, the invention is not restricted to such a structure. For example, integral molding may be carried out by a so-called outsert molding with a part of the reinforcement 72 exposed to the surface of the passage forming substrate.

Figure 9A:
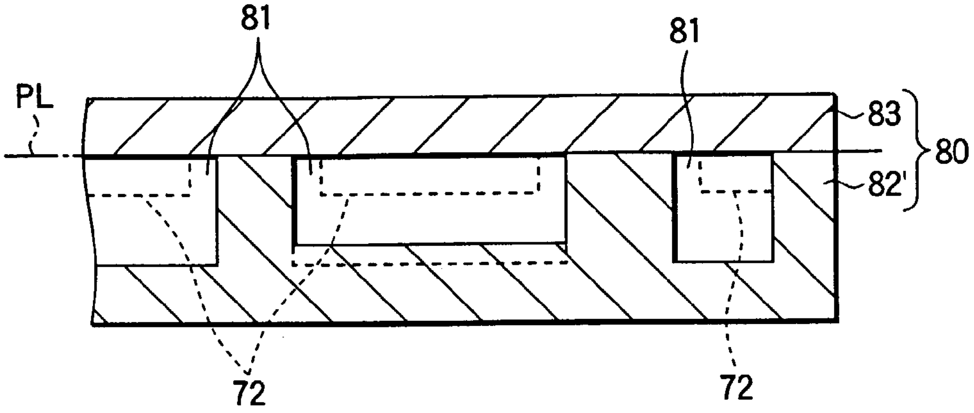
FIGS. 9A and 9B are views showing an embodiment of an outsert mold, FIG. 9A being a view illustrating a mold and FIG. 9B being a sectional view showing a recording head.

More specifically, as shown in FIG. 9A, the reinforcement 72 is provided in a cavity 81 such that one side surface is positioned on a parting line PL in a mold 80 and the opening surface of a first metal mold 82' is sealed with a second metal mold 83 to carry out the molding in this state.

Figure 9B:
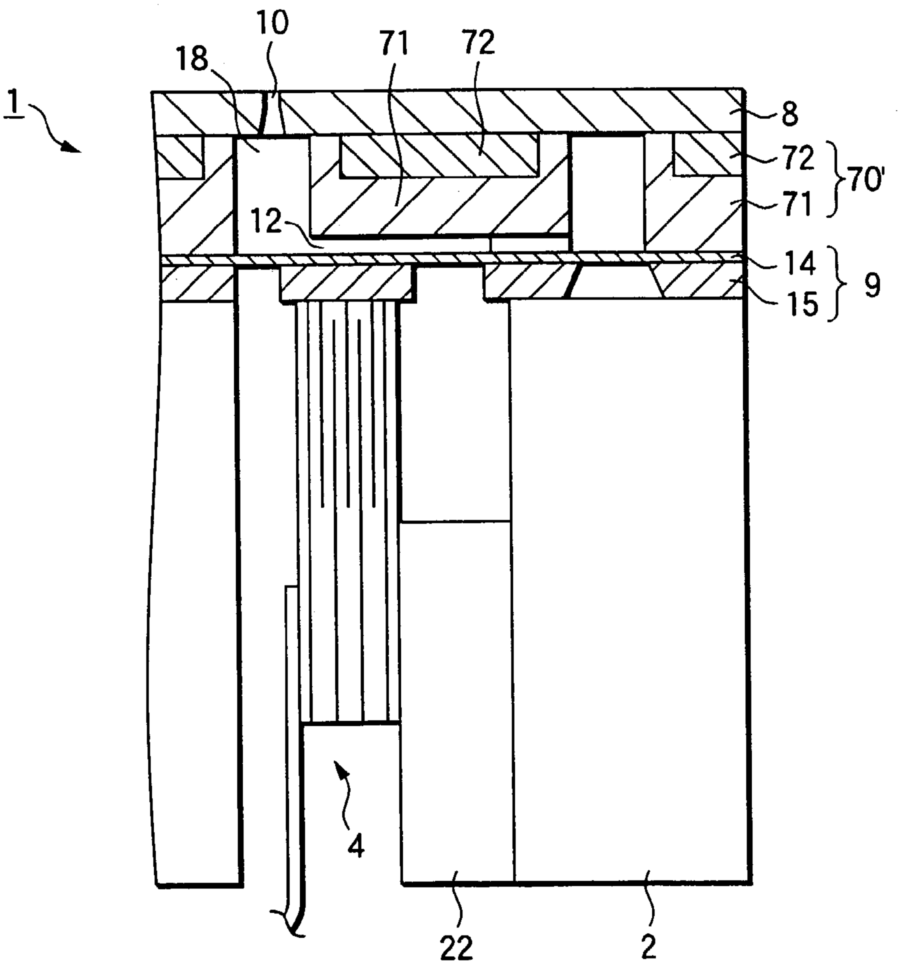

In a passage forming substrate 70' thus obtained, as shown in FIG. 9B, a partial surface of the reinforcement 72 is exposed to a surface on the nozzle plate 8 side. In other words, the surface of the resin 71 and that of the reinforcement 72 are aligned with each other and are positioned on the same level at the nozzle plate 8 side.

With such a structure, the passage forming substrate 70' can be fabricated thinly. Consequently, a length of the nozzle communicating port 18, that is, a length in a direction of a thickness of the passage forming substrate 70' can be reduced, and a natural vibration cycle Tc of a pressure generating portion (a pressure chamber in abroad sense) constituted by the pressure chamber 12 and the nozzle communicating port 18 can be reduced. As a result, even if a driving frequency is increased, an ink drop can be discharged stably and an operating voltage for driving a piezoelectric vibrator 21 can be more reduced than that in the related art.

Referring to the outsert mold, the thickness of the reinforcement may be set to be equal to that of the passage forming substrate and the internal wall portion of the reinforcement may be covered with a resin to partition an ink passage.

Figure 10:
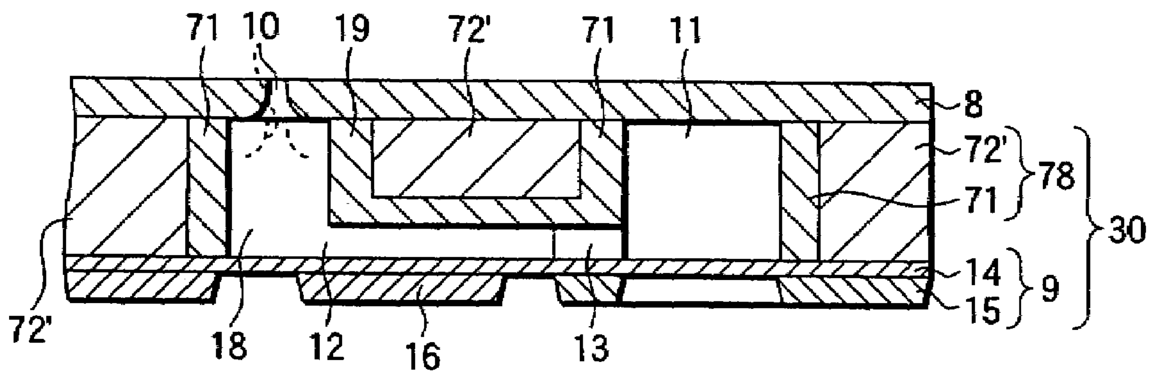
FIG. 10 is a sectional view showing a main part of a variant of the outsert mold.

As shown in FIG. 10, a passage forming substrate 78 includes a reinforcement 72' and the resin 71 covering the internal wall portion of the reinforcement 72'. The reinforcement 72' is a plate-shaped member formed to have a thickness equal to the thickness of the passage forming substrate 78 and is constituted by a metal material such as stainless or ceramics. Grooves and space portions which act as the common ink chamber 11, the pressure chamber 12, an ink supply port 13 and the nozzle communicating port 18 are formed in the reinforcement 72'. The reinforcing plate 72' is used as a core to carry out outsert molding, thereby forming a coat of the resin 71 on the internal wall portion of the reinforcement 72', that is, the surfaces of the common ink chamber 11, the pressure chamber 12, the ink supply port 13 and the nozzle communicating port 18.

With such a structure, since a portion to be the ink passage is partitioned and formed by the resin 71, the wettability of the ink in the same portion can be made uniform and an ink flow can be stabilized. Furthermore, since the reinforcement 72' can be formed to have a sufficient thickness, the rigidity of the passage forming substrate 78 can further be increased.

The passage forming substrate 78 may be fabricated by covering the whole reinforcement 72' with the resin 71 and then wrapping a junction surface with the nozzle plate 8 and a junction surface with the vibrating plate 9 to expose the reinforcement 72' over these surfaces.

Also in the embodiment, moreover, the nozzle opening 10 may be formed integrally with the passage forming substrate 78 by a resin molding as shown in a dotted line of the drawing.

The invention is not restricted to the embodiments described above but various modifications can be made based on appended claims.

Figure 11:
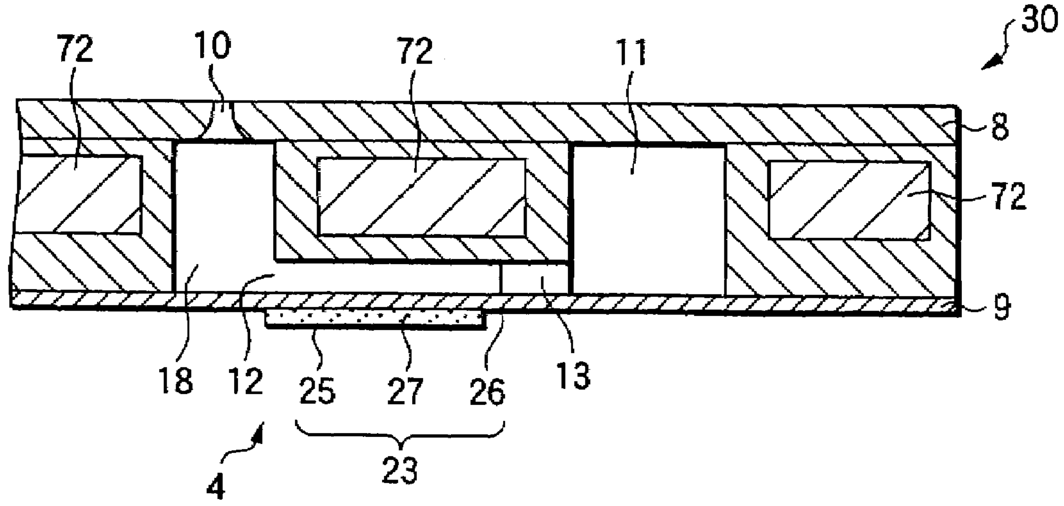
FIG. 11 is a sectional view showing a main part according to a further embodiment.

For example, as shown in FIG. 11, a flexural vibration type piezoelectric vibrator 23 may be used as a pressure generating element. The piezoelectric vibrator 23 has such a structure that a piezoelectric body 27 is interposed between an upper electrode 25 and a lower electrode 26 and the piezoelectric body 27 changes the volume of a flexing pressure chamber 12 in a direction of an electric field depending on a difference in an electric potential between the upper electrode 25 and the lower electrode 26. Furthermore, the pressure generating element is not restricted to the piezoelectric vibrator but may be an element for generating mechanical deformation through the application of a driving signal. For example, a heat generating element which applies heat to ink within the pressure chamber so that the pressure caused by air bubbles generated from the ink is utilized to eject ink, and a magnetostrictive element may be used as the pressure generating element.

Moreover, the reinforcement 72 may be constituted by a heat generating member for generating heat through the supply of a voltage. If the reinforcement 72 is constituted by the heat generating member, the ink in the ink passage can be heated so that the temperature of the ink can be managed. Also in the case of use in a low temperature environment, consequently, the temperature of the ink can be regulated to be optimum and the ink drop can be discharged stably.

A ceramics heater is suitably used for the heat generating member. More specifically, when the ceramics heater is used for the reinforcement 72, the ink can be heated without damaging the application of a rigidity to be the original function of the reinforcement 72. Moreover, the heat generating member may be constituted by a metal plate having a heater provided therein. Furthermore, if a heater having a limiter function for increasing a resistance value to lessen a quantity of current with a predetermined temperature is more suitably used for the heat generating member because the temperature of the ink can be maintained to be constant.

In each of the embodiments, the mold capable of molding a resin is not restricted to the metal mold.

As described above, according to the invention, the following effects can be obtained.

The passage forming substrate is fabricated by the integral molding using the reinforcement as a core and the ink passage is partitioned by the resin. Therefore, the ink passage can be fabricated to have a comparatively free shape with high dimensional precision. Furthermore, the wettability of the ink can be made uniform so that the ink can be caused to flow stably.

Moreover, since the reinforcing plate is used for the core, the rigidity which tends to be insufficient by only the resin can be supplemented by the reinforcing plate, and a thin passage forming substrate having a limited thickness can also obtain a necessary rigidity. Therefore, a countermeasure can be taken against external force acting on the passage forming substrate by the operation of the pressure generating element and the ink can be discharged stably.

Furthermore, in the case in which the coefficient of linear expansion of the passage forming substrate is made equal to that of the nozzle plate, it is possible to prevent the flexing deformation of the passage unit from being caused by a difference in the coefficient of linear expansion.

Moreover, in the case in which one side surface of the reinforcement is exposed to one side surface of the passage forming substrate through outsert molding, the passage forming substrate can be fabricated thinly and the length of the nozzle communicating port can be reduced. Consequently, even if the driving frequency is increased, the ink drop can be discharged stably, and furthermore, the operating voltage for driving a piezoelectric vibrator can be more reduced than that in the related art.

Furthermore, in the case in which the draft taper to be enlarged and opened from the junction surface with the nozzle plate toward the opposite surface is provided on the side wall of the ink passage, a bubble can be prevented from staying in the ink passage and a bubble discharging property can be enhanced. Moreover, the parting line of the mold can also be aligned with the junction surface with the nozzle plate in the passage forming substrate and a spew generated during the molding can easily be removed through a processing such as wrapping.

Moreover, in the case in which the nozzle opening is formed integrally with the passage forming substrate by the mold, it can be provided in series without a seam of the ink passage and the nozzle opening. Consequently, the ink flow can be carried out more smoothly and the ink can be discharged stably. Moreover, since the ink passage and the nozzle opening are partitioned and formed by the same resin, the wettability of the ink can be made uniform. Also in this respect, the ink can be discharged stably.

Furthermore, in the case in which the bottom portion on the nozzle opening side in the common ink chamber is provided integrally with the passage forming substrate by the mold and the bottom portion is formed thinly to be the compliance portion, the compliance of the common ink chamber can be maintained easily and the degree of freedom of design can be increased. Moreover, the compliance can be adjusted by regulating the thickness of the compliance portion. Therefore, it is possible to easily obtain a desirable compliance.

Moreover, in the case in which the coefficient of linear expansion of the passage forming substrate is made equal to that of the vibrating plate, it is possible to prevent the flexing deformation of the passage unit from being caused by the difference in the coefficient of linear expansion.

What is claimed is:

1. A method of manufacturing an ink jet type recording head, which includes a passage unit having a passage forming substrate provided with an ink passage, the method comprising:

molding the passage forming substrate in a resin for partitioning the ink passage and a reinforcement as a core of the passage forming substrate, using a mold; and connecting a vibrating plate on a side of the passage forming substrate;

wherein the molding comprises applying the resin and the reinforcement to a first mold of the mold having a cavity formed in conformity with an external shape of the passage forming substrate and setting a plate-shaped second mold of the mold on the first mold;

wherein the cavity has a portion formed in conformity with an external shape of a nozzle opening to integrally form the nozzle opening with the passage forming substrate;

wherein the setting further comprises providing a clearance between the first mold and the second mold to thereby form a resin cover portion over the nozzle opening; and wherein the molding further comprises removing the resin layer to expose the nozzle opening.

2. The method of manufacturing the ink type recording head according to claim 1, wherein an abutment surface of the first mold and the second mold is aligned with a junction surface of the passage forming substrate and a nozzle plate.

3. The method of manufacturing the ink type recording head according to claim 2, wherein the reinforcement is buried in the resin.

4. The method of manufacturing the ink type recording head according to claim 2, wherein a part of the reinforcement is exposed to the junction surface.

5. The method of manufacturing the ink type recording head according to claim 1, wherein the cavity is inclined to be expanded and opened toward the second mold.

6. The method of manufacturing the ink jet type recording head according to claim 1, further comprising removing the passage forming substrate from the mold.

7. The method of manufacturing the ink jet type recording head according to claim 1, wherein the mold is a multi-piece separable metal mold.

8. A method of manufacturing an ink jet head, comprising:

insert molding a metal reinforcement in a resin passage forming substrate in a mold, wherein the mold forms a resin portion of the resin passage forming substrate in conformity with a shape of an ink passage, and the metal reinforcement forms a core;

removing the passage forming substrate from the mold;

arranging a metal nozzle plate on a first side of the passage forming substrate; and arranging a vibrating plate on a second side, opposite the first side, of the passage forming substrate.

9. The method according to claim 8, where the mold comprises first and second mold halves, and an abutment surface of the first and second mold halves is aligned with the first side of the passage forming substrate.

10. The method according to claim 8, wherein the resin portion covers the metal reinforcement on both the first and second sides of the passage forming substrate.

11. The method according to claim 8, wherein the resin portion covers the metal reinforcement on one of the first and second sides of the passage forming substrate, and the metal reinforcement extends to the other one of the first and second sides of the passage forming substrate.

12. The method according to claim 8, wherein the metal reinforcement extends to both the first and second sides of the passage forming substrate.

13. The method according to claim 8, further comprising integrally molding a nozzle in the passage forming substrate in the mold.

14. The method according to claim 13, further comprising:

forming a clearance portion covering the nozzle; and removing the clearance portion.

* * * * *